United States Patent Office 3,088,980
Patented May 7, 1963

3,088,980
HYDROXYALKYLATION OF PHENOLS
John C. Smith and Wilbur L. Bressler, Lake Jackson, Tex., assignors to The Dow Chemical Company, Midland, Mich., a corporation of Delaware
No Drawing. Filed Oct. 2, 1959, Ser. No. 843,944
3 Claims. (Cl. 260—613)

The present invention relates to the hydroxyalkylation of phenols and is more particularly concerned with the hydroxyalkylation of bisphenols.

The known prior art is plagued with low yields due to losses in recrystallizations and purification of the usual reaction mixture to obtain a usable product. Further, the reaction time is long and commercially impracticable due to the low reaction temperatures attendant with the use of reaction solvents from which the desired product can be obtained.

It is therefore an object of the present invention to provide an improved process for the preparation of hydroxyalkylated phenols. It is a further object of the present invention to provide a novel process for the preparation of hydroxyalkylated phenols which has the advantage of shorter reaction times. Another object of the present invention is to provide a solvent free process for producing hydroxyalkylated phenols. These and other objects will become apparent from the following specification and claims.

It has now been found that hydroxyalkylated phenols may be prepared by reacting, in the absence of any reaction solvent, a mono- or dihydroxyaromatic compound of the benzene series, such as phenols, alkylphenols, bisphenols, alkylidene bisphenols, dihydric phenols and the like in the presence of an alkali metal catalyst such as a carbonate or hydride as for example, lithium carbonate, sodium carbonate, potassium carbonate, cesium carbonate, lithium hydride and the like with a 1,2-glycerol carbonate having the structure

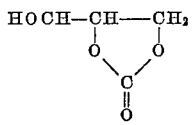

The reaction proceeds smoothly with the formation of the desired product and carbon dioxide of reaction at reaction temperatures of from about 160° to about 240° C. Good results are obtained when employing from 1.01 to about 1.15 moles of 1,2-glycerol carbonate per molecular equivalent of a phenol and from 0.005 to about 0.05 percent by weight of catalyst. The term "molecular equivalent of phenol" refers to the amount of phenolic compound containing 17 parts by weight of phenolic hydroxy groups.

In a preferred manner of carrying out the process of the present invention, the phenol, carbonate and catalyst are mixed or otherwise blended together and the resulting mass slowly heated to the reaction temperature and held thereat until the evolution of carbon dioxide of reaction has substantially ceased. Upon the cessation of carbon dioxide evolution the reaction mass is filtered to remove the catalyst and obtain the desired product as a light liquid which upon cooling solidifies.

The following examples are illustrative of the process of the present invention but are not to be construed as limiting.

*Example 1.—3,3'-Isopropylidene Bis(p-Phenyleneoxy) Di-2,3-Propane Diol*

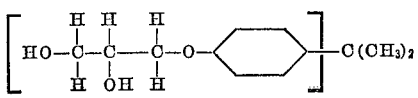

164 grams (0.50 mole) of isopropylidenediphenol, 123.9 grams (1.05 mole) of 1,2-glycerol carbonate and 0.08 grams (0.01 mole) of lithium hydride were mixed together and heated slowly until carbon dioxide gas began to evolve. The temperature was thereafter raised slowly to 220° C. and maintained thereat until the evolution of carbon dioxide gas had substantially ceased. The evolution time was approximately twenty minutes. The light yellow liquid thus obtained was filtered to remove the lithium hydride. The filtrate was solidified to obtain the desired product as a solid having an OH content of 18.5%.

*Example 2*

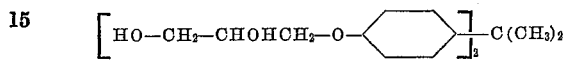

114.0 grams of isopropylidenediphenol, 118 grams of 1,2-glycerol carbonate and 0.08 gram of lithium hydride are mixed together and heated slowly until carbon dioxide gas begins to evolve. The temperature is thereafter raised slowly to 190° C. and maintained thereat until the evolution of carbon dioxide gas has substantially ceased. The evolution time is approximately 3 hours. The resulting mixture was filtered to remove the catalyst and obtain a 3,3'-isopropylenebis(p-phenyleneoxy)-1,2-propanediol product analyzing 18.2% by weight OH.

*Example 3*

In the manner of Example 1 employing diphenol in place of 2,2'-isopropylidenediphenol there was obtained a 3,3'-diphenylenedioxydi(1,2-propanediol) product having a molecular weight of 334.

In a like manner other polyhydroxy phenoxy compounds can be obtained. Thus employing 2,2'-sec.-butylidene bisphenol, resorcinol, hydroquinone, or catechol and the glycerol carbonate and catalyst one can obtain, 3,3'(sec. - butylidene) - bis(p-phenyleneoxy)di(1,3 - propanediol), 3,3'-m-phenylenedioxy - di(1,2 - propanediol), 3,3'-p-phenylenedioxydi(1,2-propanediol), 3,3'-o-phenylenedioxydi(1,2-propanediol), respectively.

We claim:

1. In a process for preparing dihydroxyalkylated phenols, the steps comprising reacting a mixture of one molecular equivalent of a phenol and at least one mole of 1,2-glycerol carbonate in the presence of a catalytic amount of an alkaline catalyst selected from the group consisting of alkali metal hydrides and carbonates and at a temperature of from about 160° to about 250° C.

2. A process which comprises reacting one molecular equivalent of a phenol with about 1.01 to 1.15 moles of 1,2-glycerol carbonate in the presence of from 0.005 to 0.05 percent by weight of an alkaline catalyst, and at a temperature of from about 160° to about 240° C. and recovering a hydroxyalkylated phenol product.

3. A process as defined in claim 1 wherein the catalyst is lithium hydride.

References Cited in the file of this patent

UNITED STATES PATENTS

| | | |
|---|---|---|
| 2,766,292 | Monson et al. | Oct. 9, 1956 |
| 2,915,529 | Bell et al. | Dec. 1, 1959 |
| 2,987,555 | Davis | June 6, 1961 |

OTHER REFERENCES

Carlson et al.: Jour. Amer. Chem. Soc., vol. 69 (1947), pp. 1952–1955.

Peppel: Ind. & Eng. Chem., vol. 50 (1958), pp. 767–770.